UNITED STATES PATENT OFFICE.

JAMES C. GRAVES AND ARTHUR E. SCHAEFER, OF SAGINAW WEST SIDE, MICHIGAN.

PROCESS FOR THE PRODUCTION OF MAGNESIUM CHLORID.

1,090,125.  Specification of Letters Patent.  Patented Mar. 10, 1914.

No Drawing.  Application filed June 15, 1912. Serial No. 703,841.

*To all whom it may concern:*

Be it known that we, JAMES C. GRAVES and ARTHUR E. SCHAEFER, citizens of the United States, and residing at Saginaw West Side, Michigan, have invented certain new and useful Improvements in Processes for the Production of Magnesium Chlorid, of which the following is a specification.

Our invention relates to the production of magnesium chlorid from a solution containing a mixture of calcium and magnesium chlorids, and has for its object an improved process of accomplishing this result by fractional crystallization.

A solution to which our process is applicable may be a natural brine containing calcium and magnesium chlorids, with or without sodium chlorid, or a bittern produced from a natural brine by any commercial process and which contains these chlorids. Brines and bitterns vary in the degree of their concentration and in the proportionate amounts of chlorids held in solution, but for convenience of description we will hereinafter describe our process as applied to a natural brine, such as those occurring in Michigan, Ohio and West Virginia.. In these brines the amount of calcium chlorid held in solution is usually about two and one-half times as much as the magnesium chlorid. If the total anhydrous chlorids of calcium and magnesium be represented by 100, the proportionate anhydrous magnesium chlorid will usually range from 26 to 30 parts, and, for convenience of subsequent description, the calcium and magnesium chlorids in solution will be referred to by their anhydrous proportions without respect to the concentration of the solution.

In carrying out our process we first boil the original brine to a certain concentration, and then cool to a certain temperature to cause the formation of crystals which are higher in magnesium chlorid than the original brine. The mother liquor is then drawn off and the crystals dissolved. The new solution is then boiled to a lower concentration and cooled to form a second crop of crystals still higher in magnesium chlorid. The mother liquor is drawn off and the new crystals dissolved. These steps are repeated a desirable number of times to obtain a desired purity of magnesium chlorid. In each step after the first, the mother liquor when drawn off is sent back to the step preceding to be mixed with the solution there being concentrated. Thus, if the process be continuous in five steps through five concentrating pans, the dissolved crystals will move step by step from the earlier to the later pans of the series while the mother liquor will move in the reverse direction from the later toward the earlier pans. When sodium chlorid is present in the original brine or bittern it may be removed by a preliminary step. This preliminary step consists of concentrating the brine to about 45° Baumé and cooling to about 100° Fahrenheit. The crystals formed will include practically all of the sodium chlorid and small quantities of calcium and magnesium chlorids. These crystals may be saved or run to the sewer, or the calcium and magnesium chlorids may be recovered by washing with water. In what is to follow we will assume that this preliminary step is unnecessary or has already been taken.

For the purpose of making clear the principles upon which our process is founded we will make certain preliminary statements of matters which influence the manner of carrying out the process.

(*a*) After concentration by evaporating and upon cooling the brine, magnesium chlorid crystallizes more rapidly than calcium chlorid as long as the cooling process is not carried below a certain critical temperature, but this difference in rate of crystallization depends upon the relative proportions of magnesium and calcium chlorids in the solution and upon the concentration to which the solution is boiled. Below the critical temperature, calcium chlorid crystallizes more rapidly than magnesium chlorid. Hence, cooling is stopped before the critical temperature is reached.

(*b*) In any solution, the higher the concentration to which it is boiled the greater is the yield of crystals and the higher is the proportion of calcium chlorid in them. Also, a saturated solution of magnesium chlorid is of much lower gravity than a saturated solution of calcium chlorid, hence, the degree of concentration in the successive steps of the process decreases as the solutions are richer in magnesium chlorid and poorer in calcium chlorid.

In the statement (*a*) reference is made to a critical temperature above which magnesium chlorid crystallizes more rapidly than calcium chlorid, and below which calcium chlorid crystallizes more rapidly than magnesium chlorid. This critical temperature varies with the ratio of calcium and magnesium to each other in the solution. In a solution containing 71 parts of calcium chlorid to 29 parts of magnesium chlorid, the critical temperature is about 77° Fahrenheit; when the solution contains 60 parts of calcium chlorid to 40 parts of magnesium chlorid, the critical temperature is about 58° Fahrenheit; with a solution having 40 parts of calcium chlorid to 60 parts of magnesium chlorid, the critical temperature is about 40° Fahrenheit; and in a solution containing 24 parts of calcium chlorid to 76 parts of magnesium chlorid, the critical temperature is below 32° Fahrenheit. With these points determined it is easy to plot a diagram which will give the critical temperatures at other relative proportions of calcium and magnesium to each other. As the process consists in the elimination of calcium chlorid so as to leave a nearly pure magnesium chlorid, and as the quantity of magnesium chlorid in each crop of crystals increases by each cooling after concentration, it is desirable that the cooling process be carried near to but not below the critical point. By cooling the solution to near the critical point, say to within five or ten degrees of it, the process may be carried out in two or three steps, depending upon the purity desired in the final product of magnesium chlorid. For commercial reasons, however, it is advantageous not to cool so near to the critical point and to use more steps in producing the final product. In what follows will be given the details of a continuous five-step process which we have found to be satisfactory in ordinary commercial operations.

Assuming an original brine or mother liquor having 71 parts of calcium chlorid and 29 parts of magnesium chlorid, and to have been previously freed from sodium chlorid, this solution is boiled in pan No. 1 to about 47° Baumé, as measured in the boiling solution, and cooled to 100° Fahrenheit. The crystals formed will consist of about 60 parts calcium chlorid and 40 parts magnesium chlorid. The mother liquor left after the crystallization will contain about 86 parts of calcium chlorid and 14 parts of magnesium chlorid, and is drawn off and used for other purposes. The crystals formed in pan No. 1 are dissolved to form a new solution containing 60 parts of calcium chlorid to 40 parts of magnesium chlorid which is sent to pan No. 2. This solution is boiled to 43° Baumé and cooled to 70° Fahrenheit. The new crop of crystals formed consist of about 40 parts of calcium chlorid and 60 parts of magnesium chlorid. The mother liquor, from which this crop of crystals is obtained, contains about 71 parts of calcium chlorid and 29 parts of magnesium chlorid and is pumped back into pan No. 1 to form part of the solution to be next concentrated in that pan. The crystals formed in pan No. 2 are dissolved and sent to pan No. 3. This solution is boiled to 39° Baumé and cooled to 70° Fahrenheit. The resulting crystals in pan No. 3 consist of about 24 parts of calcium chlorid and 76 parts of magnesium chlorid, and the mother liquor contains about 52 parts calcium chlorid to 48 part of magnesium chlorid. This mother liquor is pumped back to pan No. 2 and there mixed with the dissolved crystals coming from pan No. 1. The crystals formed in pan No. 3 are dissolved and sent to pan No. 4 where the solution is boiled to 36° Baumé and cooled to 70° Fahrenheit. The crystals formed in this step of the process consist of about 10 parts of calcium chlorid and 90 parts of magnesium chlorid. The mother liquor from which these crystals are formed contains about 32 parts of calcium chlorid and 68 parts of magnesium chlorid and is pumped back to pan No. 3 to be mixed with dissolved crystals coming from pan No. 2. The crystals formed in pan No. 4 are dissolved and sent to pan No. 5 to be boiled to 34° Baumé and cooled to 70° Fahrenheit. The resulting crystals consist of about 4 parts of calcium chlorid and 96 parts of magnesium chlorid, while the mother liquor contains about 18 parts of calcium chlorid and 82 parts of magnesium chlorid and is pumped back into pan No. 4. The crystals formed in pan No. 5 are dissolved and sent to a concentrator where they are concentrated to dry fused crystals ready for market. If more than 96 per cent. of purity is desired, the process may be carried one or more steps further before fusing.

When it is desired to remove by some other means the calcium chlorid remaining after the last step in a process having any number of steps such as those described, we add to a solution of the dissolved crystallized product a soluble sulfate, preferably magnesium sulfate, whereupon the calcium chlorid is removed by the formation of an insoluble calcium sulfate. The chemical formula for this is:

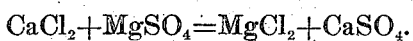
$$CaCl_2 + MgSO_4 = MgCl_2 + CaSO_4.$$

This process of removing the calcium chlorid by chemical reaction and the precipitation of an insoluble calcium sulfate may be applied at any time, but we find it more economical to apply it to solutions low in calcium chlorid, i. e., after several steps have been taken in the crystallizing process previously described.

Instead of applying magnesium sulfate directly we may accomplish the same result by adding to the solution an excess of magnesium hydrate in suspension, and then adding a sufficient quantity of sulfuric acid. This dissolves the magnesium hydrate with the formation of magnesium sulfate, which in turn precipitates the insoluble calcium sulfate as before described. The excess of magnesium hydrate serves to prevent corrosive action by the sulfuric acid on the containers employed and also to remove by precipitation as hydrates any soluble iron salts which may be in the solution. The magnesium hydrate required for this step in the process may advantageously be obtained by treating the mother liquor from the first step in the crystallizing process with calcium hydrate in the form of milk of lime.

We claim as our invention:

1. The process of separating magnesium chlorid by successive crystallizations from solutions containing calcium and magnesium chlorids which consists in arresting each step in the crystallizing process before the solution has been cooled to the critical temperature below which calcium chlorid crystallizes more rapidly than magnesium chlorid.

2. The process of separating magnesium chlorid by successive crystallizations from solutions containing calcium and magnesium chlorids which consist in boiling each successive solution to a less degree of concentration and in arresting each crystallizing step before the solution has been cooled to the critical temperature.

3. The process of separating magnesium chlorid from solutions containing calcium and magnesium chlorids by successive fractional crystallizations each of which occurs in a different pan, which process consists in successively moving and re-dissolving in water the crystallized parts of the solutions step by step from the earlier to the later pans of the series of pans, and in moving the mother liquors in the reverse direction from the later to the earlier pans.

4. The process of separating calcium chlorid and magnesium chlorid individually from solutions containing both of them which consists in effecting partial crystallization of these salts in each pan of a series of pans, in arresting each crystallization before the solution from which it is taking place has been cooled to the critical temperature, in moving the uncrystallized portion of each solution from pan to pan in one direction, and in re-dissolving in water each crop of crystals and moving the new solutions from pan to pan in the opposite direction.

5. The process of separating calcium chlorid and magnesium chlorid progressively by partial crystallizations and re-dissolvings in water in a series of pans from solutions containing both salts which consists in concentrating the solutions in the different pans to successively lower degrees in the successive pans, in transferring the mother liquor from each partial crystallization to the pan within which the next higher degree of concentration occurs, and in transferring dissolved crystals from the pan within which they are formed to the pan within which the next lower degree of concentration occurs.

6. The process of separating calcium chlorid and magnesium chlorid individually from solutions containing both by a series of successive partial crystallizations in a corresponding series of pans which consists in concentrating the solutions in successive pans to successively lower degrees, in arresting the formation of crystals in each pan before the solution therein has been cooled to its critical temperature, in moving the mother liquor of later pans to the next earlier pans, and in moving the dissolved crystals of earlier pans to the next later pans.

7. The process of separating magnesium chlorid from a solution containing both magnesium and calcium chlorids which consists in successively concentrating and cooling the solution to form crystals, in arresting the formation of crystals before calcium chlorid has begun to crystallize as rapidly as magnesium chlorid, in re-dissolving the crystals so formed, and eventually separating the residue of calcium chlorid by adding a soluble sulfate to the new solution to form with said calcium chlorid an insoluble precipitate and separating that from the solution.

8. The process of separating magnesium chlorid from a solution containing both magnesium and calcium chlorids which consists in removing the principal part of the magnesium chlorid and some of the calcium chlorid by crystallization, in re-dissolving the crystals to form a new solution containing a greater relative proportion of magnesium chlorid, and in removing the residue of calcium chlorid by adding to the new solution magnesium hydrate in suspension and sulfuric acid and removing the precipitate so produced.

9. The improved process of separating magnesium chlorid from a solution containing that and calcium chlorid, which consists in both concentrating and cooling moderately to a point above a critical point at which the rate of crystallization reverses and the calcium chlorid crystallizes out faster than the magnesium chlorid, then effecting the crystallization and thereby securing a product proportionately higher in magnesium chlorid than existed in the solution, re-dissolving the crystals so secured in water, again concentrating and cooling to a new point above, but approaching, a new critical point at which this new concentrated solution would reverse its rate of crystallization, effecting the crystallization, and so repeating these series of steps until magnesium chlorid of the desired purity is obtained.

10. The improved process of separating magnesium chlorid from a solution containing that salt and calcium chlorid, which consists in both concentrating and cooling the solution moderately to a point above a critical point at which the rate of crystallization reverses and the calcium chlorid crystallizes out faster than the magnesium chlorid, then effecting the crystallization and thereby securing a product proportionately higher in magnesium chlorid than existed in the solution, recovering and re-dissolving the crystallized product so secured in water, again concentrating and cooling to a new point above, but approaching, a new critical point at which this new concentrated solution would reverse its rate of crystallization, effecting the crystallization and thus securing a product proportionately higher in magnesium chlorid than existed in the solution from which this product is secured, returning the mother liquor from this step to the solution of a next preceding similar step, re-dissolving the crystallized product last secured and again repeating the steps of concentration, cooling and crystallizing, and so repeating until the product secured is of desired purity, the mother liquor of each crystallizing step being returned to the solution of a similar preceding treatment.

11. The process of separating one, from two or more water-soluble crystallizable substances, held in a hydrous solution, which consists in cooling such solution in concentrated form to effect crystallization, arresting the crystallizing step when, or before, the solution has been cooled to the critical temperature below which the substance being separated out ceases to crystallize more rapidly than the other contained substance or substances, removing the thus formed crop of crystals from that solution and re-dissolving said crystals in water, then again cooling a concentrated solution of said crystals to effect crystallization and arresting this crystallizing step when, or before, the solution has been cooled to the critical temperature below which the substance being separated out ceases to crystallize more rapidly than the other contained substance or substances and so repeating until a desired degree of purity has been attained.

JAMES C. GRAVES.
ARTHUR E. SCHAEFER.

Witnesses:
W. W. SMITH,
G. C. CASTWOOD.